No. 778,222. PATENTED DEC. 27, 1904.
A. CHURCHWARD.
AUTOMATIC CURRENT REGULATOR FOR ELECTRIC MOTORS.
APPLICATION FILED JULY 16, 1903.
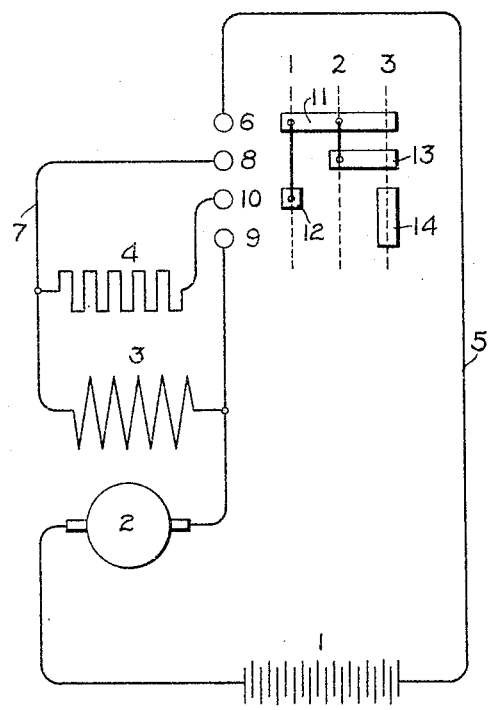
Witnesses.
Thos Howe
Helen Orford
Inventor.
Alexander Churchward,
by Albert M. Davis
Att'y.

No. 778,222. Patented December 27, 1904.

UNITED STATES PATENT OFFICE.

ALEXANDER CHURCHWARD, OF NEW YORK, N. Y., ASSIGNOR TO GENERAL ELECTRIC COMPANY, A CORPORATION OF NEW YORK.

AUTOMATIC CURRENT-REGULATOR FOR ELECTRIC MOTORS.

SPECIFICATION forming part of Letters Patent No. 778,222, dated December 27, 1904.

Application filed July 16, 1903. Serial No. 165,758.

*To all whom it may concern:*

Be it known that I, ALEXANDER CHURCHWARD, a citizen of the United States, residing at New York, in the county of New York, State of New York, have invented certain new and useful Improvements in Automatic Current-Regulators for Electric Motors, of which the following is a specification.

This invention relates to series electric motors which operate under varying loads—such, for instance, as those used to drive automobiles.

The object of my invention is to provide a novel arrangement of the motor-circuits and a novel control therefor which shall enable the motor to operate most efficiently under the varying conditions of operation—in starting, in running at full speed on good level roads, and in running at lower speed on rough roads or upgrades. The conditions for most economical operation of the motor differ with the varying running conditions of the vehicle, and economy in the motor is especially important when a storage battery is employed as the source of current, since an excessive demand for current results in the rapid deterioration of the battery.

The conditions for most economical operation of the motor may be outlined as follows: At starting a very strong field is required in order to give a high torque per ampere, and so avoid an excessive demand for current. To meet this condition, I overwind the motor-field, making it stronger in proportion to the armature than is customary, thereby increasing the starting torque per ampere. When this is done, however, it is necessary to weaken the field in order to enable the motor to run at high speed on good level roads, since if the field were not weakened the counter electromotive force would rise too rapidly, due to the excessive field strength, to permit the motor to reach its normal full speed. To meet this condition, I provide a resistance, with a manually-controlled switch arranged to connect the resistance in shunt to the field, thereby weakening the field and making it possible to bring the motor up to its normal full speed for operation on good level roads.

On poor roads or on upgrades, on the other hand, not only is a strong field advantageous for giving a high torque, but it also acts to reduce the motor speed, and consequently to reduce the motor output, thus preventing the motor from overloading itself and drawing an excessive current from the battery by trying to drive the vehicle too fast. To meet this condition, I make the resistance above mentioned of a material, such as iron, having a high temperature coefficient, so that when a bad road or a long grade is encountered and an increased current is taken by the motor the shunt heats rapidly and throws a greater portion of the current into the motor-field coils, thus enabling the overwound field to come into play with advantage. Furthermore, since the variation in the shunt resistance is wholly automatic absolute protection is given to the battery, since the speed of the vehicle on a bad road is not left to the discretion of the operator.

The accompanying drawing is a diagram of circuits embodying my invention.

The storage battery 1 supplies current to the series motor, whose armature is shown at 2 and its overwound field-coils at 3. A resistance 4, preferably of iron wire, is arranged in shunt to the field-coils. By means of a suitable controller this resistance may be utilized as a starting resistance, if desired. Such a controller is illustrated in the diagram. One armature-terminal is connected permanently with one terminal of the battery. The other battery-terminal is connected by a lead 5 with a finger 6 of the controller. One field-coil terminal is connected by a lead 7 with a finger 8 and the other with a finger 9. The resistance has one end connected with the lead 7 and the other with a finger 10.

The controller-cylinder, which is shown in developed condition, has a segment 11, making contact with the finger 6 in all three working positions of the controller. In the first position a segment 12, connected with the segment 11, makes contact with the finger 10. In the second and third positions a segment 13, connected with the segment 11, makes contact with the finger 8. In the third position an insulated segment 14 connects the fingers 9 and 10. It follows from this construction that in the first working position the resistance will be in series with the motor, in the second position the resistance will be cut out, and in the third position it will be in shunt to the field-coils 3 and in position to automatically regulate the current flowing through said coils, as hereinbefore described. If more than three speeds are desired, additional fingers can be connected to intermediate points on the resistance, or a supplemental resistance can be used.

The ratio between the shunt 4 and the coils 3 may be anything desired. Moreover, the ratio may be varied to meet varying requirements due to different road conditions in different localities and in different seasons.

In accordance with the patent statutes I have described the principle of operation of my invention, together with the apparatus which I now consider to represent the best embodiment thereof; but I desire to have it understood that the apparatus shown is only illustrative and that the invention can be carried out by other means and applied to series motors other than those used to drive automobiles.

Having thus described my invention, what I claim is—

1. The combination with an overwound series electric motor, of a shunt around the field-coils of said motor, said shunt being adapted to increase its resistance automatically when the current exceeds a predetermined value.

2. The combination with an overwound series electric motor, of a resistance having a high heat coefficient, and means for connecting said resistance in shunt to the field-coils of the motor.

3. The combination with an overwound series electric motor, of a resistance of iron wire in shunt to the field-coils of said motor.

4. The combination with an overwound series electric motor, of a resistance having a high heat coefficient, and a controller arranged to first place said resistance in series with the motor, then cut it out, and finally connect it in shunt to the field-coils of said motor.

In witness whereof I have hereunto set my hand this 15th day of July, 1903.

ALEXANDER CHURCHWARD.

Witnesses:
   EDWARD WILLIAMS, Jr.,
   HELEN ORFORD.